United States Patent
Albani et al.

(10) Patent No.: US 8,321,505 B1
(45) Date of Patent: *Nov. 27, 2012

(54) GENERATING PREVIEW BUNDLES CORRESPONDING TO CONTENT PAGES

(75) Inventors: Andrea Albani, Mercer Island, WA (US); Viraj V. Sanghvi, Seattle, WA (US); Jeremy Boynes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,036

(22) Filed: Oct. 6, 2011

Related U.S. Application Data (63) Continuation of application No. 12/621,819, filed on Nov. 19, 2009, now Pat. No. 8,041,764.

(51) Int. Cl.
*G06F 15/16* (2006.01)
*G06F 15/173* (2006.01)

(52) U.S. Cl. ......... 709/203; 709/217; 709/219; 709/224

(58) Field of Classification Search .................. 709/203, 709/205, 217; 715/208, 229, 234; 726/28
See application file for complete search history.

(56) References Cited

U.S. PATENT DOCUMENTS

| | | | | |
|---|---|---|---|---|
| 6,732,331 | B1 * | 5/2004 | Alexander | 715/234 |
| 7,155,491 | B1 * | 12/2006 | Schultz et al. | 709/217 |
| 7,426,687 | B1 * | 9/2008 | Schultz et al. | 715/208 |
| 7,536,641 | B2 * | 5/2009 | Rosenstein et al. | 709/205 |
| 7,814,560 | B2 * | 10/2010 | Bellagamba et al. | 726/28 |
| 7,823,057 | B1 * | 10/2010 | Schultz et al. | 715/229 |
| 2006/0235690 | A1 * | 10/2006 | Tomasic et al. | 725/37 |
| 2009/0113282 | A1 * | 4/2009 | Schultz et al. | 715/208 |

* cited by examiner

*Primary Examiner* — Quang N. Nguyen
(74) *Attorney, Agent, or Firm* — Thomas|Horstemeyer, LLP (57) ABSTRACT

Disclosed are various embodiments for generating and/or processing a preview bundle. Embodiments include receiving a request from a client to generate a preview network page that corresponds to a production network page generated in a production environment. Embodiments further include specifying at least a portion of the preview network page as a user developed portion. Embodiments also include generating the preview network page that is based at least upon the production network page and by replacing source elements of the production network page associated with the user developed portion with at least one data structure element that contains the data elements referenced by the source elements of the corresponding production network page.

16 Claims, 6 Drawing Sheets

FIG. 1

```
<html>
    <head>
        <title>Page Foo</title>
    <head>
    <body>
        Content
        <img src="http://www.ecommerce.business/product.png"/>              203

<%@ taglib uri="http://www.ecommerce.business/previewBundle"
    prefix="pb" %>
                                                                            205
<pb:loadDataElements>
{
    "requestScope" : {
        "foo" : false,
        "bar" : "This item is out of stock"
    },
    "productData" : {                                                       201
        "type" : Sprocket,
        "name" : "Widget",
        "price": $9.99
    }

}
</pb:loadDataElements>

<jsp:include page="userGeneratedTemplate.jsp"/>

Additional Content                                                  207
    </body>
</html>
```

GENERATING PREVIEW BUNDLES CORRESPONDING TO CONTENT PAGES

CROSS REFERENCE TO RELATED APPLICATION

This application claims priority to U.S. patent application entitled "Generating Preview Bundles Corresponding to Content Pages" filed on Nov. 19, 2009 and assigned application Ser. No. 12/621,819, now issued U.S. Pat. No. 8,041,764, issued on Oct. 18, 2011, which is incorporated herein by reference in its entirety.

BACKGROUND

Merchants or other entities often outsource development of an electronic commerce presence on the Internet or other networks. These tasks can be outsourced to entities with expertise in development and management of an electronic presence. A merchant or other entity may wish to develop source code for generating user interfaces to be deployed on infrastructure maintained by another entity. However, the entity may not wish to grant access to the merchant to proprietary services that may be utilized to generate content or retrieve data for the layouts or user interfaces. Likewise, an entity may wish to outsource the development of layouts or user interfaces to be deployed on its infrastructure without granting access to its proprietary services as described above.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to facilitating development of source code for a user interface, templates, content pages, network pages, web pages, or other content that is generated by a content server. A content server can facilitate an electronic commerce system, search system, publishing system, or other content system as can be appreciated. A content server may also rely at least in part upon proprietary services, application programming interfaces (APIs) or other proprietary applications in order to retrieve or generate data displayed to a client.

To this end, a content server can encode or render user interfaces developed in various languages. As a non-limiting example, the content server can employ a web application framework that processes documents authored in languages including JavaServer Pages (JSP), Active Server Pages (ASP), PHP, or other languages as should be appreciated. User interfaces written in these languages and executed within a web application framework can facilitate the rendering of a presentation language viewable by a client. For example, a JSP page can direct a web application framework to generate hypertext markup language (HTML) pages viewable in a browser on a client.

Additionally, user interfaces written in a web application framework language may invoke functions, API calls, web services, or other services in order to retrieve or generate data to populate within other various user interface or source elements generated by the web application framework. As a non-limiting example, in the case of a content server implementing an electronic commerce system, a user interface may include instructions that retrieve data from an electronic repository regarding products available from a merchant and place the data in a HTML formatted table. As another non-limiting example, in the case of a content server implementing a search engine, a user interface may include instructions that retrieve search results from a search application to deliver relevance based search results and place them within HTML formatted tags in a content page or web page.

Accordingly, the source code of user interfaces of such web based applications may invoke certain functions, APIs, web services, etc., that are proprietary, trade secret, or otherwise confidential in nature. As a non-limiting example, certain portions of the source code of an application that generates a user within a web application framework may include functions that authenticate the identity of a user or manipulate other sensitive information. Additionally, certain functions, APIs, web services, etc., may only be accessible by certain users based upon their identity, while within a certain network, behind a firewall, etc. Therefore, a user that does not meet certain criteria cannot develop a user interface, even if it is desired that they do so. As a non-limiting example, if certain services invoked by a user interface require presence behind a firewall, it may not be feasible to easily outsource development of certain portions of a user interface.

Therefore, it may be desirable to facilitate development of a user interface by certain users who either cannot access all data, functions, APIs, etc., that are necessary for a user interface to be encoded or generated for transmission or viewing on a client. Likewise, it may also be desirable to facilitate development of a user interface by certain users while preventing these users from accessing proprietary services and/or sensitive information that may be employed in generating the user interface.

Figure 1:
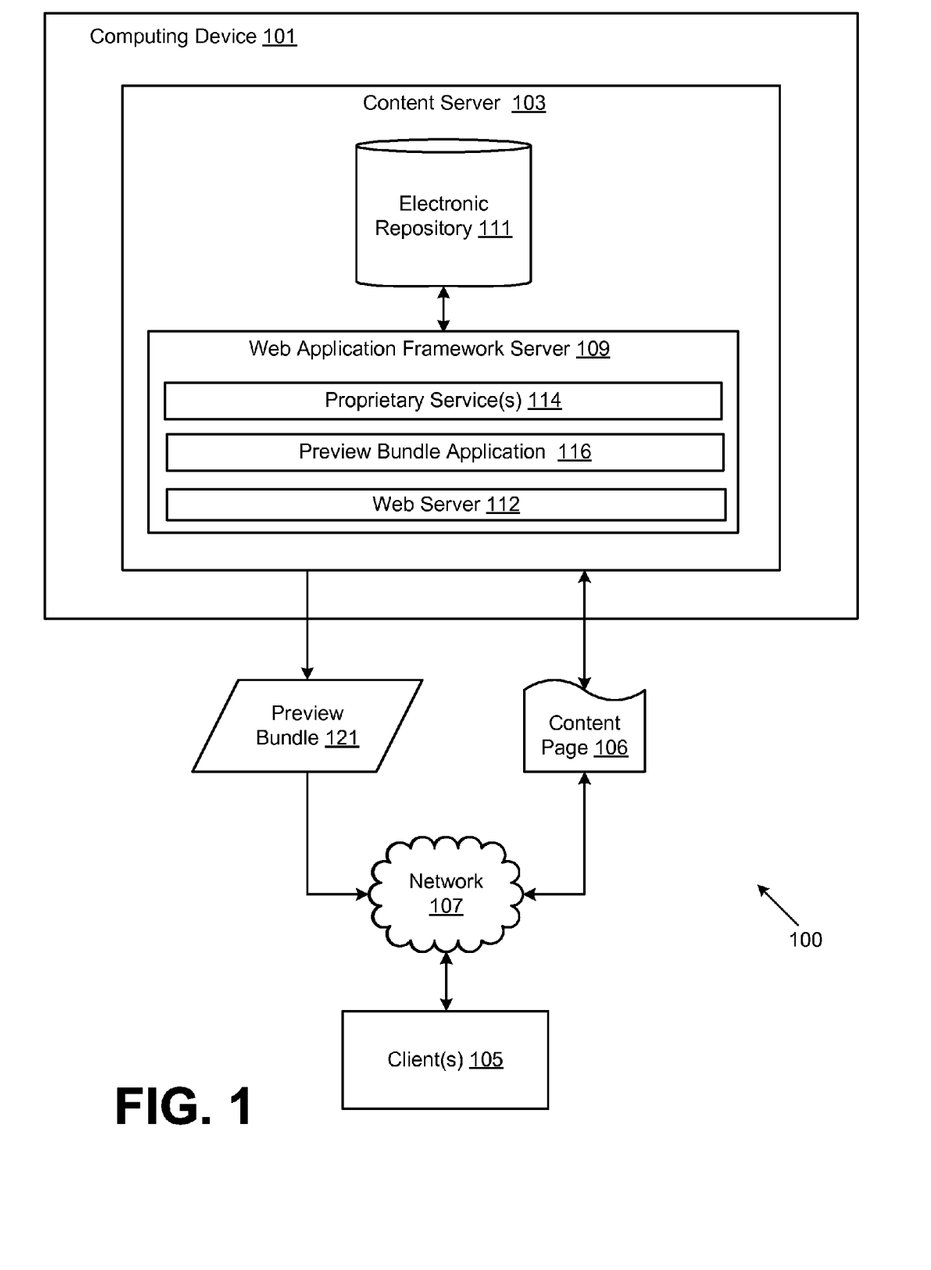
FIG. 1 is a drawing of a networked environment including a computing device executing a web application framework server and preview bundle application according to an embodiment of the present disclosure.

Accordingly, with reference to FIG. 1, shown is a networked environment 100 according to various embodiments of the disclosure. The networked environment 100 includes a computing device 101 implementing a content server 103. The depicted example shows an embodiment of a computing device 101 implementing a content server 103 that can facilitate an electronic commerce system, search engine, etc., and it should be appreciated that alternative embodiments of the disclosure can be implemented in the context of other types of applications in which content is delivered to a client 105. The computing device 101 is in data communication with one or more clients 105 by way of a network 107. The network 107 includes, for example, the Internet, intranets, extranets, wide area networks (WANs), local area networks (LANs), wired networks, wireless networks, or other suitable networks, etc., or any combination of two or more such networks.

The computing device 101 may comprise, for example, a server computer or like system. The computing device 101 may represent multiple devices arranged, for example, in one or more server banks or other arrangements. The computing device 101 may be located in a single installation or may be dispersed among many different geographical locations. As a non-limiting example, data stores or electronic repositories 111 depicted within the computing device 101 may be implemented in a first installation while one or more of the remaining logical components of the computing device 101 may be implemented in a second installation, with the two installations in data communication with one another. For purposes of convenience, the computing device 101 is referred to herein in the singular. However, in one embodiment, the computing device 101 can represent a plurality of devices arranged as described above.

A client 105 may be configured to execute various applications such as a browser and/or other applications. The browser may be executed in a client 105, for example, to access content pages 106, network pages, and/or web pages provided by the content server 103. In other embodiments, the functionality performed by the client 105 and the computing device 101 may be performed in a single computer system such as, for example, a standalone kiosk.

As noted above, the computing device 101 is configured to implement a content server 103 that is configured to generate content served to clients. To this end, the content server 103 can execute various applications such as, for example, a web application framework server 109 that can generate content for clients communicating with the content server 103 via the network 107. The content server 103 can also include at least one electronic repository 111 that can store various data depending on the type of content that is provided to a client 105. The electronic repository 111 can also represent external data services that access a repository accessible via a network through which data is generated or retrieved by the web application framework server 109 in order to generate content.

As one non-limiting example, in the case of an electronic commerce system implemented by the content server 103, the electronic repository 111 may be used to store product data and other data related to products in an electronic commerce system. Product data may include many fields of data regarding each item, such as, but not limited to, the following: product category, title, keywords, description, price, weight, shipping methods, related images, reviews, similar items, meta data, hidden text, a list of merchants selling the item, stock number, other associated categories, page view history, etc. The electronic repository 111 can also include other data related to products as can be appreciated, but are not necessary to discuss herein for an understanding of the various embodiments of the disclosure.

Accordingly, the web application framework server 109 can process templates, pages, and/or source code, etc. written in a programming language that is configured to generate a user interface in a format viewable by a client 105. In one embodiment, the web application framework server 109 can encode HTML documents for display on a browser on a client 105. To this end, as directed by a source code processed by the web application framework server 109, data can be retrieved from the electronic repository 111 or other sources that can be presented to a client 105 in a user interface viewable on a client 105. As a non-limiting example, a JSP page processed by the web application framework server 109 can generate HTML tags with content that is at least in part retrieved from the electronic repository 111. Although the above examples (and other examples herein) are discussed with reference to a JSP web application framework as well as an HTML user interface encoded for a client 105, it should be appreciated that various web application framework languages and various user interface formats can be employed in accordance with embodiments of the disclosure.

Continuing the above non-limiting example, a client 105 can interact with an electronic commerce system implemented by the content server 103 and cause various JSP pages (which can also be stored on and/or retrieved from an electronic repository 111) to initiate the generating of various user interfaces employed in the electronic commerce system via the web application framework server 109. For example, if a user desires to search the electronic commerce system for a product, a JSP page configured to handle this search request from the user can invoke search functions, APIs, web services, etc., in order to cause a search of the electronic repository 111 to be initiated. Accordingly, the JSP page can further be configured encode a user interface (e.g., HTML document) in which to present the search results such that they are viewable, for example, in a browser on a client 105.

In addition, a user may then desire to purchase a product from the electronic commerce system. Accordingly, a JSP page configured to handle such a request from a client 105 can invoke payment functions or payment services that enable a user to purchase a product in the electronic commerce system as well as encode HTML tags to display various user interface elements with which a user may interact on a client 105 in order to complete the payment process. It should also be appreciated that other user interfaces can be encoded by the web application framework server 109 for a client 105 in this way, and that the above examples are non-limiting.

The web application framework server 109 can execute various applications in order to provide content to a client 105 which can include, but are not limited to, a web server 112 and other proprietary services 114 that can be implemented within the web application framework server 109. A client 105 can interface with the web application framework server 109 via a web server 112 and cause the web application framework server 109 to generate a content page 132 or user interface to a client 105. As noted above, the proprietary services 114 provided by the web application framework server 109 can include various functions, APIs, web services, or other services provided in a content server 103 that can be employed by the web application framework server 109 in order to encode a user interface for a client 105.

As noted above, a content page 106 or user interface generated by the content server 103 and transmitted to a client 105 may rely on proprietary services 114 provided in or accessible to the content server 103. Additionally, it may be desirable to facilitate third party development of templates, source code, and/or content pages 106, etc., for processing by the web application framework server 109 for generating a user interface for a client 105 without providing access to these proprietary services 114. As one non-limiting example, the proprietary services 114 can include functions, APIs, web services, etc., that may be confidential in nature, trade secret, or may involve the manipulation of sensitive data, etc. As an additional example, access to these proprietary services 114 may require access to a private network, presence behind a firewall, or other restricted access as can be appreciated.

Additionally, a user wishing to develop a user interface for a content server 103 may not have access to electronic repositories 111 from which data is retrieved in order to encode a user interface.

Accordingly, third party development of templates, source code, content pages 106, etc., can be facilitated by the preview bundle application 116, which can be executed by the web application framework server 109 and/or content server 103. The preview bundle application 116 can generate a preview bundle 121 that corresponds to a content page 106 provided to a client 105 in a production environment. In other words, a preview bundle 121 corresponds to and is based upon a content page 106 or user interface that a browser on a client 105, for example, would render for display.

Preview bundles 121 can be generated for various use cases so that third party user interface development can be accomplished for a variety of content pages 106 encoded for display on a client 105. As a non-limiting example, in the case of an electronic commerce system implemented by a content server 103, preview bundles 121 can be generated for a shopping cart user interface, product search user interface, user check out, etc., and other user interfaces as can be appreciated that may be generated by a content server 103.

In order to facilitate third party development of user interfaces, a preview bundle 121 can include data elements that are provided in a corresponding content page 106 but without visual elements or source elements (e.g., HTML tags) that are encoded in the content page 106 in a production environment. In other words, the preview bundle application 116 can, in one embodiment, generate a preview bundle 121 by removing source elements from a production content page 106 that are encoded in order to present the data elements and replacing them with the data elements in a data structure. By presenting the data elements in a data structure, third party development of user interfaces is facilitated because source code, templates, etc., can be developed external to the content server 103 without needing access to proprietary services 114 and/or the electronic repository 111. In other words, third party iterative development of user interfaces can be accomplished using a preview bundle 121 because the data elements that would be retrieved in a production environment (e.g., for generating a content page 106) are present in the preview bundle 121. The preview bundle 121 can also include supporting files that may be referenced by a production content page 106 that are inaccessible outside a content server 103, private network, etc., such as, but not limited to, images, style sheets, etc.

The preview bundle 121 can also designate a portion of a production content page 106 as a user developed portion, while designating a remainder of the content page 106 as a static portion. In other words, the preview bundle application 116 can generate visual elements of the static portion of the preview bundle 121 corresponding to a content page 106 just as they would appear in the corresponding production content page 106. The preview bundle application 116 can then remove the visual elements or source elements (e.g., HTML tags) from the production content page 106 corresponding to the preview bundle 121 and insert a data structure containing the data elements that appeared in the user developed portion of the content page 106.

As a non-limiting example, a preview bundle 121 corresponding to a content page 106 in a production environment can designate a header and/or footer of the content page 106 as a static section, because it is not desired that third party user interface development occur in these portions of the content page 106. In contrast, the remainder of a content page 106 upon which a preview bundle 121 is based can be designated as a user developed portion because it may rely on data retrieved from the electronic repository 111 and/or proprietary services 114. As an example of the above scenario, if a content page 106 in an electronic commerce system implemented by the content server 103 corresponds to a shopping cart of a user, the product data encoded for display by the web application framework server 109 can include product data retrieved from the electronic repository 111.

Figure 2:
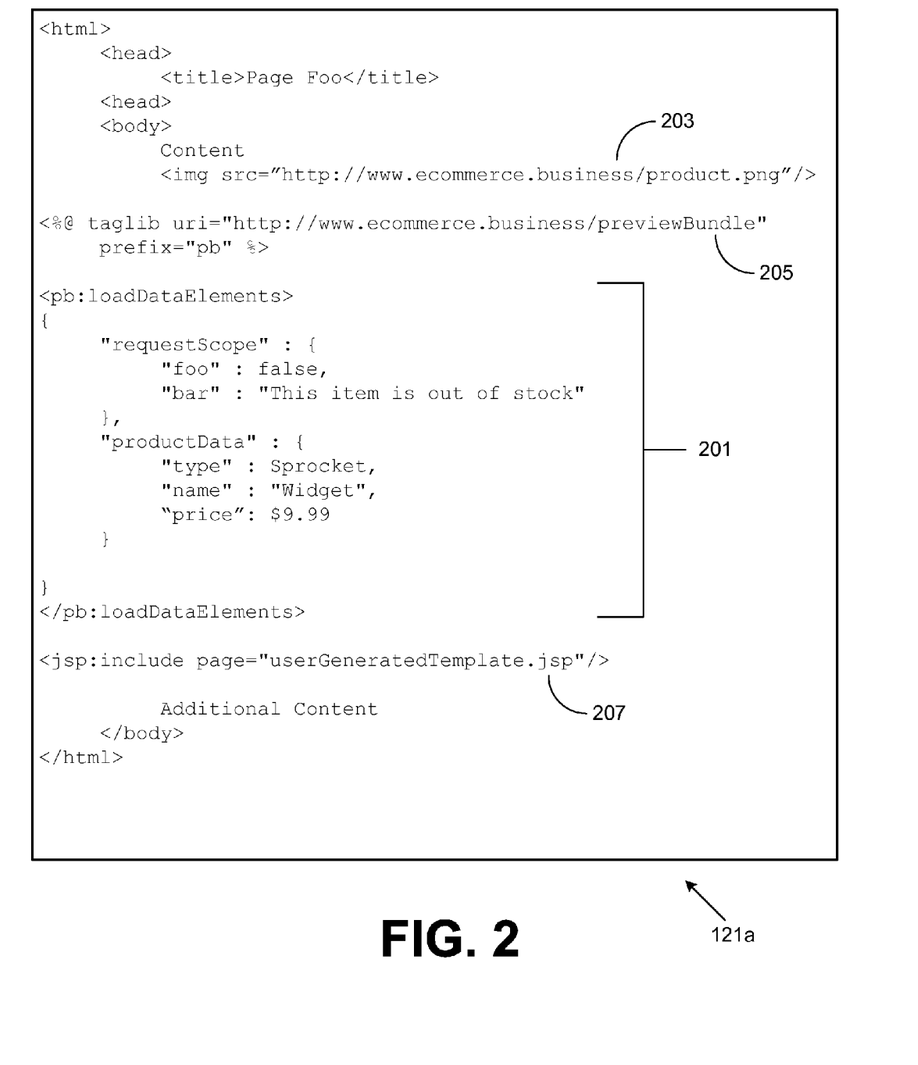
FIG. 2 is a drawing of a preview bundle generated by a preview bundle application of FIG. 1 according to an embodiment of the present disclosure.

Reference is now made to FIG. 2, which depicts one non-limiting example of a portion of a preview bundle 121a that can be generated by the preview bundle application 116 (FIG. 1). As noted above, the preview bundle 121a can correspond to a content page 106 (FIG. 1) or network page that is generated in a production environment. The preview bundle 121a can be generated in order to facilitate third party development of templates, source, etc., with which a web application framework server 109 (FIG. 1) can encode a user interface (e.g., HTML).

FIG. 2 also depicts a preview bundle 121a having a user developed portion 201. The depicted preview bundle 121a also includes other specialized tags, including a taglib tag 205 and an include tag 207, which are special-purpose tags that allow processing of the preview bundle 121a to facilitate third party user interface development. The taglib tag 205 is a web application framework construct that permits the use of custom tags in a web application framework programming language. Accordingly, a preview bundle 121a can be generated by employing a custom set of tags that may not be rendered by a client 105 (FIG. 1) but allow data to be embedded within the preview bundle 121a alongside source elements that a client can render (e.g., HTML tags). Likewise, the include tag 207 is another web application framework construct that permits referencing or including of additional templates, source, etc., that can be processed by a web application framework server 109. It should be appreciated that other, similar constructs in other web application framework languages can be employed to accomplish a similar goal, and that the depicted JSP example is illustrated for the purposes of facilitating discussion herein.

A remainder of the preview bundle 121a is a static portion as described above. In the depicted example, the static portion of the preview bundle 121a is represented by HTML elements that do not require any further processing by the web application framework server 109 in order to generate a user interface that is viewable by a client 105. Source element 203 references an image to be rendered in a user interface on a client 105. Accordingly, the preview bundle 121a can also include the image file or other supporting files (e.g., image, style sheet, etc.) referenced by the content page 106 corresponding to the depicted preview bundle 121a.

In the depicted example, the user developed portion 201 includes a serialized data structure containing the data elements referenced by the source code and/or template employed by a content server 103 to generate a user interface. The data structure can reference data elements in the same manner as they would be referenced as if they were retrieved from a electronic repository 111 or proprietary services 114 in a production environment so that third party development of source code for the web application framework server 109 can be accomplished without deviation from how the web application framework server 109 would behave in a production environment.

In other words, the data elements in the depicted data structure in the user developed portion 201 of the preview bundle 121a can have the same variable names in the preview bundle 121a as they would have in a production environment so that source code developed based upon a preview bundle 121a would behave the same as it would in a production environment on a content server 103 of FIG. 1. A data structure as described above can be represented in various formats. In the depicted example, the data structure is formatted in JavaScript Object Notation (JSON) format. It should be appreciated that the data structure can be represented in various formats, including, but not limited to extensible markup language (XML), or other data representation formats as can be appreciated.

The depicted preview bundle 121a can be processed by a layout preview server 501 (FIG. 5) that mimics the behavior of a content server 103 in the way that a user developed template is processed and a content page 106 generated. The layout preview server 501 as well as how it can process the user developed portion 201, the taglib tag 205, and include tag 207 of the preview bundle 121a is discussed in greater detail hereinbelow. An additional, alternative depiction of a preview bundle 121 according to an embodiment of the disclosure will now be discussed.

Figure 3:
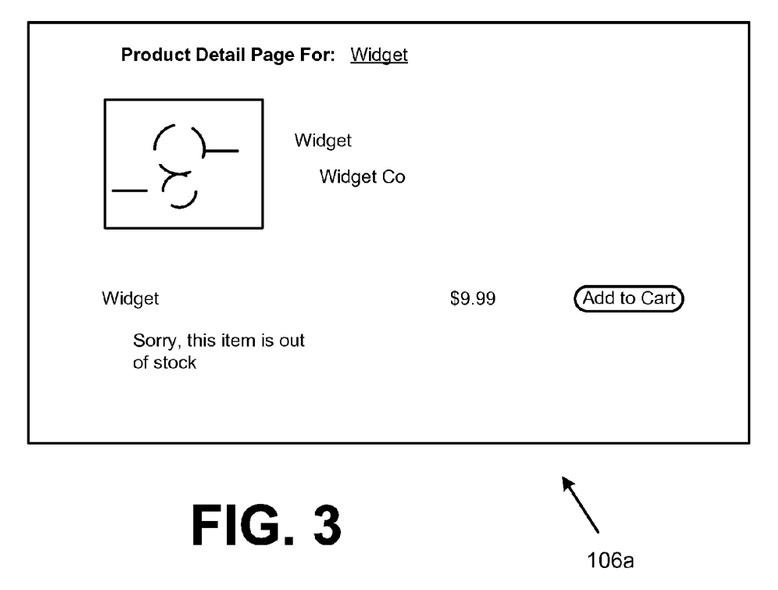
FIG. 3 is a drawing of a content page generated by a content server in the networked environment of FIG. 1 according to an embodiment of the present disclosure.

Reference is now made to FIG. 3, which depicts an example of a content page 106a generated by a content server 103 (FIG. 1). In the depicted example, an electronic commerce system implemented by a content server 103 displays product information. It should be appreciated that the data elements in the depicted content page 106a can be retrieved from an electronic repository 111 (FIG. 1) or via proprietary services 114 (FIG. 1) as noted above.

Figure 4:
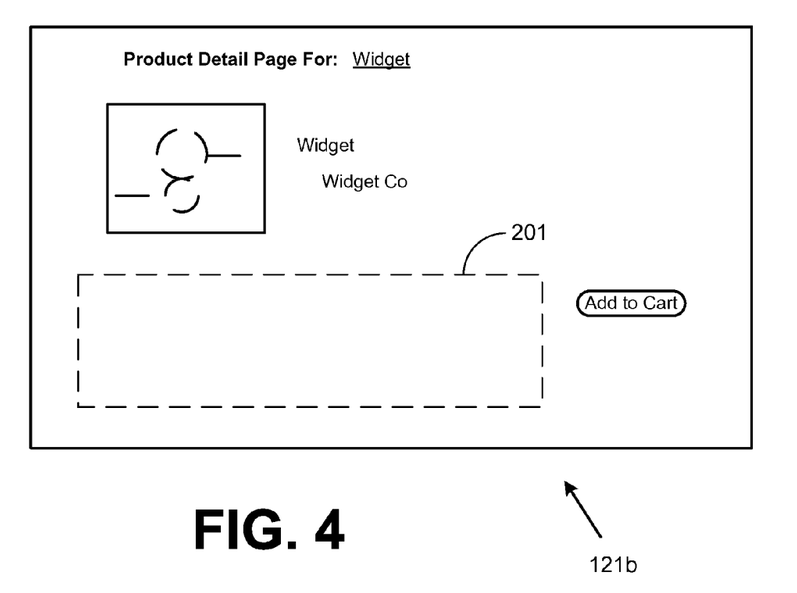
FIG. 4 is an alternative depiction of a preview bundle generated by a preview bundle application of FIG. 1 according to an embodiment of the present disclosure.

FIG. 4 illustrates an alternative depiction of a preview bundle 121b corresponding to the content page 106a of FIG. 3. In the depicted example, the preview bundle 121b can designate one or more portions of the content page 106a as a user developed section. In one example, the user developed sections can include several disjointed sections of a content page 106a. Accordingly, the source elements which would be rendered by a client 105 (FIG. 1) have been replaced by a data structure containing the data elements that appeared in the content page 106a of FIG. 3. In the illustration of FIG. 4, the preview bundle 121b is depicted substantially as it would be rendered by a client 105 according to an embodiment of the disclosure. In other words, because the source elements in the static portion of the preview bundle 121b remain unchanged, the static elements would render as a content page 106a generated by a content server 103 (FIG. 1) in a production environment. In contrast, the user developed portion 201 (FIG. 2) of the preview bundle 121b would not be rendered by a client 105, as the source elements have been removed. Accordingly, source code, template, etc., that can be applied to the user developed portion 201 can be developed for the designated user developed portion 201 of the preview bundle 121b.

Figure 5:
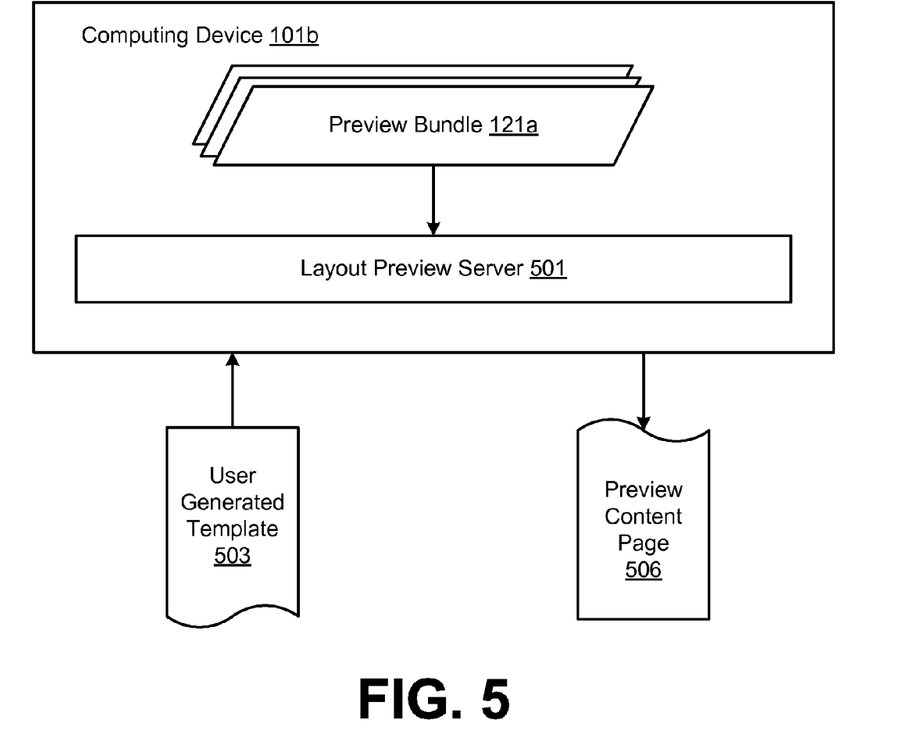
FIG. 5 is a drawing of a layout preview server according to an embodiment of the present disclosure.

Reference is now made to FIG. 5, which depicts one non-limiting example of a computing device 101b. The depicted computing device 101b implemented a layout preview server 501 according to an embodiment of the disclosure. As referenced above, a preview bundle 121a can be processed by a layout preview server 501 that mimics the behavior of a content server 103 (FIG. 1) in the way that a user developed template is processed and a content page 106 (FIG. 1) generated.

Using the depicted non-limiting preview bundle 121a of FIG. 2 as an example, the layout preview server 501 can process the preview bundle 121a and apply a user generated template 503 to the preview bundle 121a in order to generate a preview content page 506 that corresponds to a content page 106 in a production environment. As depicted in FIG. 5, the layout preview server 501 allows a user generated template 503 corresponding to source code of a user generated portion 201 of a preview bundle 121a to be developed without access to electronic repositories 111 (FIG. 1) and/or proprietary services 114 (FIG. 1) that are provided in a content server 103 in a production environment.

To accomplish this, the layout preview server 501 processes the preview bundle 121a by encoding for display in a client 105 (FIG. 1) the source elements of the static portion of the preview bundle 121a as the content server 103 in a production environment would. It should be appreciated that because the static portion of the preview bundle 121a do not require any additional processing by a web application framework server 109 (FIG. 1) or engine, the layout preview server 501 does not have to take any additional encoding steps in reference to the static portion of the preview bundle 121a. In this respect, when processing the preview bundle 121a line by line, the layout preview server 501 will allow the static portion to "pass through" to the preview content page 506.

Upon encountering the taglib tag 205 (FIG. 2) of the preview bundle 121a, the layout preview server 501 is alerted that preview bundle elements are located within the preview bundle 121a document as well as a tag prefix that is employed for preview bundle elements. In the depicted example of FIG. 2, the loadDataElements command that follows instructs the layout preview server 501 to load the data elements in the following JSON data structure into its memory. In a corresponding production environment, source code corresponding to a content page 106 may include invocation of proprietary services 114 or instructions to interact with an electronic repository 111 that loads data elements in the memory of a content server 103.

In this way, the layout preview server 501 accomplishes the same task as a content server 103 in a production environment in that the data elements required in order to process source code of a user interface and generate a user interface viewable by a client 105 are loaded into memory. Next, upon countering the include tag 207 (FIG. 2) of the preview bundle 121a of FIG. 2, the layout preview server 501 can invoke a user generated template 503 that can reference the data elements loaded into memory by the loadDataElements tag in order to generate a user interface viewable by a client 105.

Upon completion of processing the preview bundle 121a, the layout preview server 501 can then generate a preview content page 506 that corresponds to a content page 106 generated by a content server 103 in a production environment. Accordingly, the layout preview server 501 permits at least one portion of a production content page 106 to be designated as a user developed portion 201 and a corresponding preview bundle 121 generated. This facilitates third party development of a template or source code in a web application framework language, which can be applied to a preview bundle 121a to generate a preview content page 506.

The layout preview server 501 can also allow a user to interact with the various user interfaces generated by the content server 103 and retrieve a preview bundle 121 corresponding to a particular content page or user interface as they are needed. In this way, the preview server 501 can mimic interaction with a content server 103 via a variety of user interfaces by retrieving a preview bundle 121 corresponding to a content page when a user wishes to view the content page via the layout preview server 501. For example, a user can access a shopping cart user interface via the layout preview server 501, which can retrieve and process a corresponding preview bundle 121 from the content server 103. Accordingly, a user may wish to view the shopping cart user interface in a variety of ways in order to test a user generated template. For example, a user may wish to view a preview content page 506 with a corresponding preview bundle 121 via the layout preview server 501 after adding several items to a shopping cart. As another example, a user generated template may modify a portion of a content page that is common to various user interfaces. In this example, a user may wish to browse through various user interfaces by manipulating user interface elements on a preview content page 506. Accordingly, the layout preview server 501 can retrieve an appropriate preview bundle 121 corresponding to a content page when a user attempts to access a preview content page 506. In other words, the layout preview server 501 can dynamically generate a preview content page 506 depending on a content page generated by the content server 103 that a user attempts to access.

Additionally, the layout preview server 501 may also retrieve and store a plurality of preview bundles 121 to achieve a similar objective. In one example, a user may develop a user generated template in an "offline" environment and desire to test the user generated template in a variety of scenarios by employing a variety of preview content pages 506. Accordingly, the layout preview server 501 can store multiple preview bundles 121 corresponding to multiple content pages, allowing the user to view multiple preview content pages 506 without the need to separately download a preview bundle 121 corresponding to each.

Figure 6:
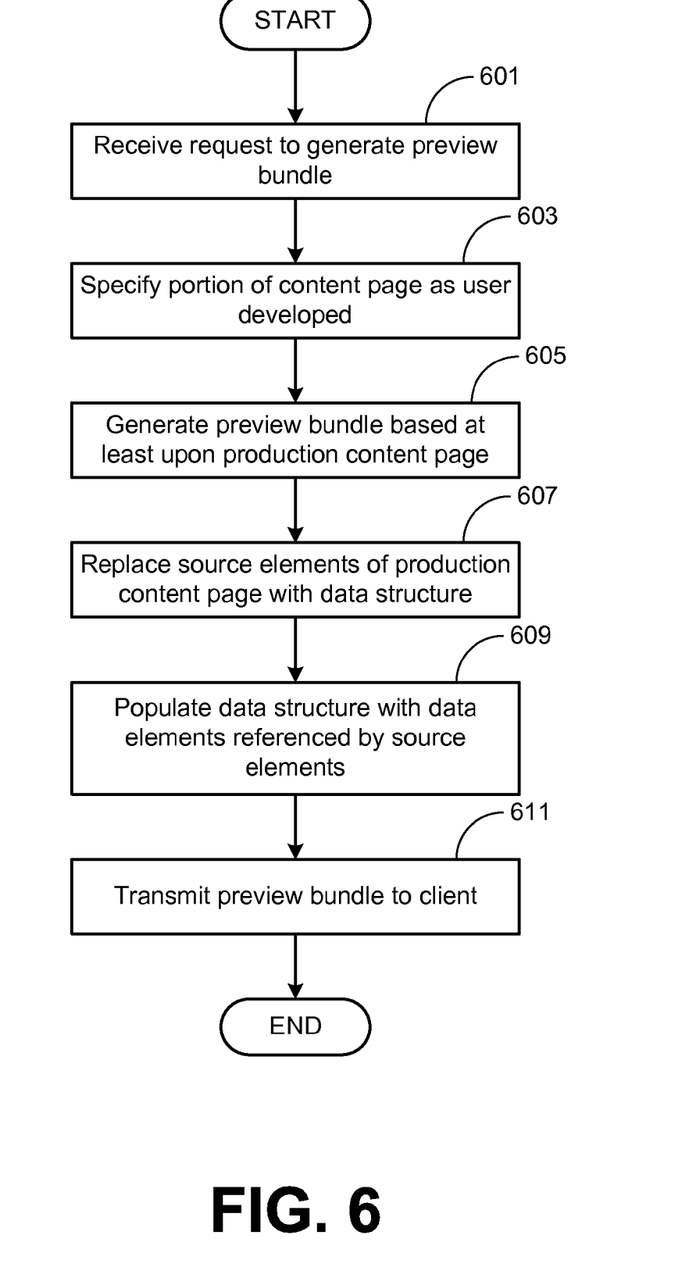
FIG. 6 is a drawing of a flowchart that illustrates one example of the operation of a preview bundle application executed in the computing device depicted in FIG. 1 according to an embodiment of the present disclosure.

Referring next to FIG. 6, shown is a flowchart that provides one example of the operation of the preview bundle application 116 (FIG. 1) according to an embodiment of the present disclosure. Alternatively, the flowchart of FIG. 2 may be viewed as depicting steps of an example method implemented in the computing device 101 (FIG. 1) to generate a preview bundle 121 (FIG. 1) corresponding to a content page 106 (FIG. 1) in a production environment. The preview bundle application 116 generates a preview bundle 121 that facilitates user interface development such that a third party or user can develop source code for generating a user interface without having access to proprietary services 114 (FIG. 1), an electronic repository 111 (FIG. 1), or other aspects of a content server 103 (FIG. 1).

Beginning with box 601, a request to generate a preview bundle 121 is received by the preview bundle application 116. In box 603, a portion of a content page 106 corresponding to a preview bundle 121 can be designated as a user developed portion (FIG. 2). In box 605, the preview bundle 121, which is based at least upon a content page 106 in a production environment, is generated. In one embodiment, content page 106 source elements (e.g., HTML tags) can be copied into the preview bundle 121. In box 607, source elements of the content page 106 upon which a preview bundle 121 is based that correspond to a designated user developed portion 201 are replaced with a data structure.

In one embodiment, the data structure can include a serialized or textual data structure that includes the data elements that would have been loaded into memory by the web application framework server 109 in a production environment. Accordingly, in box 609, the data structure is populated with data elements present in the content page 106 in a production environment. Finally, in box 611, the preview bundle 121 can be transmitted to a client 105.

Figure 7:
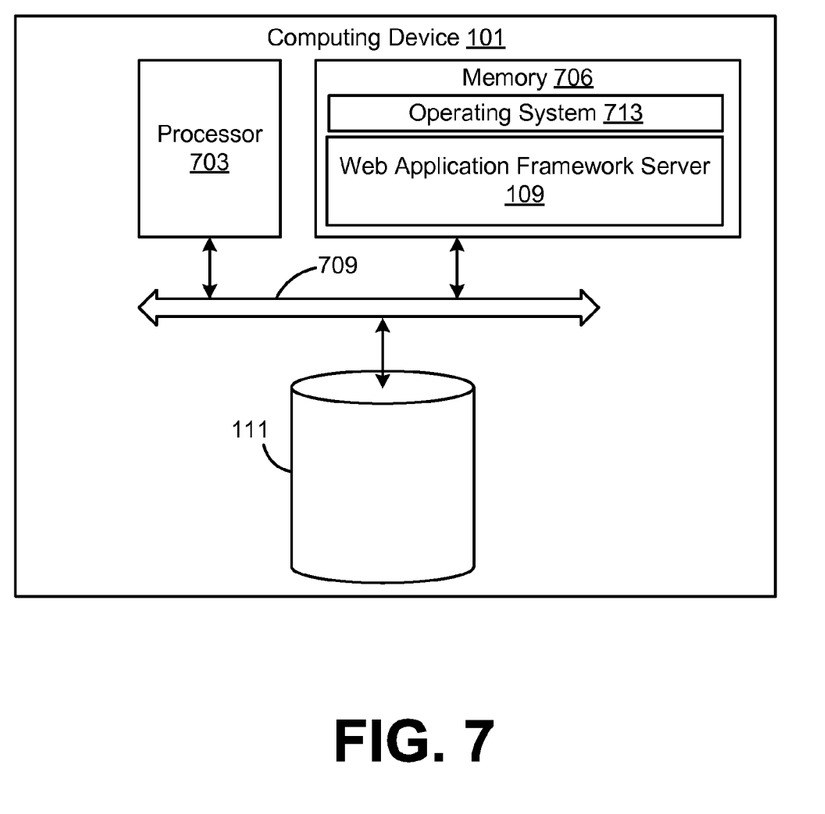
FIG. 7 is a drawing of a computing device of FIG. 1 used to implement the preview bundle application or layout preview server according to an embodiment of the present disclosure.

Referring next to FIG. 7, shown is an example of one embodiment of the one or more computing devices 101 according to various embodiments. The computing device 101 may include a processor circuit having a processor 703 and a memory 706, both of which are coupled to a local interface 709. The local interface 709 may comprise, for example, a data bus with an accompanying control/address bus as can be appreciated. To this end, each computing device 101 may comprise, for example, a computer system or other system with like capability. Such computer systems may be configured to optimally perform as a content server 103 (FIG. 1) as can be appreciated.

Various components may be stored in the memory 706 and are executable by the processor 703 including, for example, an operating system 713 and the web application framework server 109. In some embodiments, the computing device 101 can execute a layout preview server 501 (FIG. 1). In addition, other applications may be stored in the memory 706 and executable by the processor 703 as can be appreciated. The electronic repository 111 can be accessible by the processor circuit of the computing device 101 so as to access the various data stored therein. Alternatively, the electronic repository 111 may be stored in locations other than within the computing device 101 or on other computing devices.

The operating system 713 and web application framework server 109 are described as being stored in the memory 706 and executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, or source code that may be expressed in proper format such as object code that is capable of being loaded into a of random access portion of the memory 706 and executed by the processor 703, etc., An executable program may be stored in any portion or component of the memory 706 including, for example, random access memory, read-only memory, a hard drive, compact disk (CD), floppy disk, or other memory components.

The memory 706 is defined herein as both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 may represent multiple processors and the memory 706 may represent multiple memories that operate in parallel. In such a case, the local interface 709 may be an appropriate network 107 that facilitates communication between any two of the multiple processors 703, between any processor 703 and any one of the memories 706, or between any two of the memories 706, etc.

The functionality of the preview bundle application 116 as depicted by the example flowchart of FIG. 6 or other applications described herein may be implemented, for example, in an object oriented design or in some other programming architecture. Assuming the functionality is implemented in an object oriented design, each block represents functionality that may be implemented in one or more methods that are encapsulated in one or more objects. The preview bundle application 116 may be implemented using any one of a number of programming languages such as, for example, C, C++, JAVA, or other programming languages.

With reference to FIGS. 1-6, although the preview bundle application 116 is described as being embodied in software or code executed by general purpose hardware above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of the preview bundle application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flow chart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the preview bundle application 116, layout preview server 501, and/or web application framework server 109 comprises software or code, it can be embodied in any computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the preview bundle application 116, layout preview server 501, and/or web application framework server 109 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method comprising the steps of:
   receiving, in at least one computing device, a request from a client to generate a preview network page, the preview network page corresponding to a production network page generated in a production environment, the production network page comprising a plurality of source elements configured to cause display of a plurality of data elements;
   specifying, in the at least one computing device, at least a portion of the production network page as a user developed portion;
   generating, in the at least one computing device, the preview network page based at least upon the production network page by replacing at least one source element of the production network page in the user developed portion with at least one data representation of at least one data element referenced by the at least one source element of the production network page in the user developed portion, the at least one data representation of at least one data element being embedded in the preview network page;
   generating, in the at least one computing device, a preview bundle, the preview bundle including the preview network page and at least one supporting file referenced by the production network page;
   applying, in the at least one computing device, a user developed template to the preview network page, the user developed template configured to display at least one of the at least one data element with at least one user developed source element and the at least one supporting file; and
   transmitting the preview bundle from the at least one computing device to the client.

2. The method of claim 1, wherein the step of specifying at least a portion of the preview network page as a user developed portion further comprises demarcating the user developed portion from a remainder of the preview network page with at least one tag identifying the user developed portion.

3. The method of claim 1, wherein the step of specifying at least a portion of the preview network page as a user developed portion further comprises identifying source elements in the preview network page that are associated with the user developed portion.

4. The method of claim 1, wherein the at least one data representation further comprises a textual representation of the data elements.

5. The method of claim 1, wherein the data elements further comprise textual data in the production network page.

6. The method of claim 1, wherein the at least one supporting file is at least one of: an image, a client-side scripting language document, or a style sheet.

7. A method, comprising the steps of:
- receiving, in at least one computing device, a preview network page, the preview network page generated based at least upon a production network page, the production network page comprising a plurality of source elements configured to cause display of a plurality of data elements, the preview network page further having at least one portion specified as a user developed portion, wherein source elements of the production network page that are associated with the user developed portion are replaced with a representation of the data elements referenced by the source elements of the production network page;
- encoding for display, in the at least one computing device, the source elements of the preview network page other than the user developed portion; and
- applying, in the at least one computing device, a user developed template to the user developed portion of the preview network page, the user developed template being configured to facilitate display of at least a subset of the data elements from the at least one data structure element associated with the user developed portion with at least one user developed source element, the at least one user developed source element referencing the at least a subset of the data elements from the at least one data structure element, the user developed template being applied by extracting the at least a subset of the data elements from the at least one data structure element of the preview network page, and rendering a user developed user interface from the user developed template that incorporates the extracted subset of the data elements.

8. A system, comprising:
- at least one computing device; and
- logic executed on the at least one computing device, the logic further comprising:
  - logic that receives a request from a client to generate at least one content page, the at least one content page including a plurality of data elements;
  - logic that specifies at least a portion of the at least one content page as at least one user developed section and a remainder of the at least one content page as a static section;
  - logic that retrieves a subset of the data elements;
  - logic that generates a preview bundle, the preview bundle including at least one preview content page and at least one supporting file referenced by the at least one content page, wherein the at least one preview content page further comprises the at least one content page with user interface elements of the at least one user developed section removed and the subset of the data elements inserted in the at least one user developed section;
  - logic that applies a user developed template to the at least one preview content page, the user developed template configured to display at least one of the at least one content page and the at least one supporting file; and
  - logic that initiates transmission of the preview bundle from the at least one computing device to the client.

9. The system of claim 8, further comprising:
- at least one preview server; and
- logic executed on the at least one preview server, the logic further comprising:
  - logic that encodes the user interface elements of the static section of the at least one preview content page;
  - logic that applies a user developed template to the subset of the data elements; and
  - logic that encodes the at least one user developed section of the at least one preview content page.

10. The system of claim 9, wherein the at least one user developed section is delimited by tags that specify at least one beginning boundary and at least one end boundary of the at least one user developed section.

11. The system of claim 10, wherein the logic that encodes the at least one user developed section of the at least one preview content page further comprises logic that replaces the at least one user developed section with content specified by the user developed template.

12. The system of claim 9, wherein the at least one user developed section is delimited by tags that specify at least one beginning boundary and at least one end boundary of the subset of the data elements.

13. The system of claim 9, wherein the user developed template further comprises at least one of: a JavaServer Pages (JSP) formatted document, a PHP formatted document, and an Active Server Pages (ASP) formatted document.

14. The system of claim 8, wherein the at least one supporting file referenced by the at least one content page further comprises at least one of: an image, a client-side scripting language document, or a style sheet.

15. The system of claim 8, wherein the subset of the data elements further comprises at least one of: a JavaScript Object Notation (JSON) formatted data structure and an extensible markup language (XML) formatted data structure.

16. The system of claim 8, wherein the at least one content page comprises HTML tags.

* * * * *